(12) United States Patent
VanKirk et al.

(10) Patent No.: US 7,676,428 B2
(45) Date of Patent: Mar. 9, 2010

(54) SYSTEM AND METHOD FOR AIDING COMMERCIAL PROPERTY ASSESSMENT

(75) Inventors: Timothy R. VanKirk, Indianapolis, IN (US); Linda Pedalino, Indianapolis, IN (US); James Brink, San Francisco, CA (US)

(73) Assignee: IncomeWorks, Inc., Lake Forest, IL (US)

( * ) Notice: Subject to any disclaimer, the term of this patent is extended or adjusted under 35 U.S.C. 154(b) by 885 days.

(21) Appl. No.: 11/038,870

(22) Filed: Jan. 19, 2005

(65) Prior Publication Data

US 2005/0160033 A1 Jul. 21, 2005

Related U.S. Application Data

(60) Provisional application No. 60/537,739, filed on Jan. 20, 2004.

(51) Int. Cl.
*G06Q 40/00* (2006.01)
(52) U.S. Cl. .......................................... 705/38; 705/35
(58) Field of Classification Search ............. 705/35–45, 705/1, 10, 400; 364/401
See application file for complete search history.

(56) References Cited

U.S. PATENT DOCUMENTS 5,414,621 A 5/1995 Hough
5,680,305 A * 10/1997 Apgar, IV .................... 705/10
5,857,174 A * 1/1999 Dugan ........................... 705/1

6,178,406 B1 * 1/2001 Cheetham et al. ............. 705/10

(Continued)

FOREIGN PATENT DOCUMENTS

WO       WO 00/77966       12/2000

(Continued)

OTHER PUBLICATIONS

Stacy Sirmans, G., C. F. Sirmans, and John D. Benjamin. "Rental Concessions and Property Values." Journal of Real Estate Research 5.1 (Spring90 1990): 141. Business Source Complete. EBSCO. [Library name], [City], [State abbreviation]. Sep. 28, 2009 <http://search.ebscohost.com/login.aspx?direct=true&db=bth&AN=4477955&site=ehost-live>.*

(Continued)

*Primary Examiner*—Hani Kazimi
*Assistant Examiner*—Abhishek Vyas
(74) *Attorney, Agent, or Firm*—Ryndak & Suri LLP

(57) ABSTRACT

A computer system and method is disclosed that aids assessors in valuing commercial real estate. To support their cost-based value, assessors use the system to generate an income-based value. The user inputs ranking criteria. The system has a database of rents, vacancy rates, expenses, and cap rates that are derived from the market and are specific for application to properties within the assessor's district. The system calculates an income value based on recommended or custom indicators. The system also aids assessors in accurately calculating obsolescence. After the user inputs requested data, the system brings up the trended income value, calculates a percent difference between the cost and income values, and offers an obsolescence analyzer test to determine if there is obsolescence. If there is obsolescence, the system instructs the user on the correct way to apply it, and if not, additional questions are offered to help identify the discrepancy.

26 Claims, 25 Drawing Sheets

U.S. PATENT DOCUMENTS

| | | | |
|---|---|---|---|
| 7,130,810 B2 * | 10/2006 | Foster et al. | 705/10 |
| 7,236,985 B2 * | 6/2007 | Brecher | 707/104.1 |
| 2001/0039506 A1 | 11/2001 | Robbins | |
| 2002/0007336 A1 | 1/2002 | Robbins | |
| 2002/0035520 A1 * | 3/2002 | Weiss | 705/27 |
| 2002/0082903 A1 | 6/2002 | Yasuzawa | |
| 2002/0087389 A1 | 7/2002 | Sklarz et al. | |
| 2003/0078897 A1 | 4/2003 | Florance et al. | |
| 2003/0191723 A1 * | 10/2003 | Foretich et al. | 705/400 |
| 2005/0071174 A1 | 3/2005 | Leibowitz et al. | |
| 2005/0154656 A1 * | 7/2005 | Kim et al. | 705/30 |

FOREIGN PATENT DOCUMENTS

| | | |
|---|---|---|
| WO | WO 01/16847 | 3/2001 |
| WO | WO 03/062963 | 7/2003 |

OTHER PUBLICATIONS

William Tuthill. (Jul. 1999). Commercial vacancies down, rents up in downtown albany. Capital District Business Review, 26(13), 5. Retrieved Sep. 28, 2009, from Business Dateline. (Document Id: 43024611).*

"BC Assessment: The Appraisal of Real Estate" (bcassessment.gov.bc.ca/3_val/3_app.html), pp. 1-3, accessed Dec. 20, 2003.

"CAMA Solutions," www.microsolvecama.com/page6.html, pp. 1-2, accessed Dec. 20, 2003.

"Colorado Custom," www.coloradocustomware.com/products.html, pp. 1-2, accessed Dec. 20, 2003.

"Income Analysis Software—Investment Analyst," www.incomeanalysis.com/iausers.htm, pp. 1-3, accessed Dec. 20, 2003.

"Income Analysis Software—Investment Analyst Income Statement," www.incomeanalysis.com/incstat.htm, pp. 1-3, accessed Dec. 20, 2003.

"Income Analysis Software—Investment Analyst Screens," www.incomeanalysis.com/screens.htm, pp. 1-7, accessed Dec. 20, 2003.

Keystone Information Systems, "Keystone Software Products for Local Governments," www.keyinfosys.com/local_government_paas_modules.htm, pp. 1-4, accessed Dec. 20, 2003.

"Visual PAMSPro(tm) 2000 Features List," www.visualpamspro.com/prodvpp1.htm, pp. 1-4, accessed Dec. 20, 2003.

"Proving 'economic obsolescence' Can Help Industrial Owners Reduce Property Taxes," www.nreionline.com/arreal_estate_proving_economic_obsolescence/, pp. 1-3, accessed Dec. 30, 2003.

"Tax to Grind," http://www.advantax.com/NewsletterPDFs/Fall%201998.pdf, pp. 1-3, accessed Dec. 30, 2003.

"TerraScan Products: Assessment Administration, CAMA, Tax Collection and Distribution," http://www.terrascan.com/products/cama/income.asp, pp. 1-3, accesssed Dec. 31, 2003.

"Cole Layer Truble Company UNIVERS Product," www.cltco.com/UNIVERS%20Product.thm, pp. 1-4, accessed Dec. 31, 2003.

* cited by examiner

2000 Marion County Census Data

| 1999 Annual Household Income | Value of Owner Occupied Housing | Corresponding Ranking |
|---|---|---|
| $14,999 or less | $49,999 or less | Low |
| $15,000–$34,999 | $50,000–$99,999 | Average (−) |
| $35,000–$49,999 | $100,000–$149,999 | Average |
| $50,000–$74,999 | $150,000–$199,999 | Average (+) |
| $75,000 or more | $200,000 or more | High |

Enter Property Information

- Property Name — 146
- Address — 148
- Parcel No. — 150
- Number of Units — 152
- Your Name — 154

[Help]

[Finish] — 156

[Cancel]

| File View Help |

Property Information
- Property Name: Ocean View Apts.
- Address: 456 Cliffside Rd.
- Parcel No.: 12-456800-003
- Units: 75
- Your Name: Al Assessor 160 — Overall Rank: Tier2    [View/Edit Property Ratings]

Model calculations
- ● Use Recommended Parameters — 162
- ○ Select Custom Parameters — 163

Potential Gross Rent (PGR): 75 units x 12 x $520 Avg. Rent/mo. = $468,000

161 — Additional Income: 4.00% of PGR = $18,720

Potential Gross Income (PGI): $486,720

Less Estimated Vacancy at 12.00% of PGI = $58,406

Effective Gross Income (EGI): $428,314

161 — Less Expenses at 52.00% of PGR = $222,723

Net Operating Income (NOI): $205,591

Valuation
Value: $205,591 NOI ÷ Cap rate of: 9.50% = $2,164,115
        164                        166              168

Cost Comparison: <not calculated>

[TREND total value "as of" 1999 assessment date] — 170

[FINISHED total value "as of" current date] — 172

For Help, press F1

Fig. 12

```
File  View  Help                                                    _ □ X

┌─Property Information─────────────────────────────────────────────┐
│    Property Name   [ocean view apts.]    Number of Units  [220]   │
│         Address    [123 cliff lane]          Your Name  [Al Assessor]│
│       Parcel No.   [22-123345-78655]                              │
│                                                                   │
│         Overall Rank:   Tier3         [View/Edit Property Ratings]│
└───────────────────────────────────────────────────────────────────┘
┌─Model calculations───────────────────────────────────────────────┐
│   ○ Use Recommended Parameters                                    │
│   ● Select Custom Parameters                            169       │
│                                                                   │
│   Potential Gross Rent (PGR):  [220]  units x 12  x  [$450]       │
│                                                      [See Range]  │
│                                                   Avg. Rent/mo. = [$1,188,000]│
│   169                                                             │
│      Additional Income:   [4.00%]  of PGR                [$47,520]│
│                           [See Range]                             │
│                                                                   │
│   Potential Gross Income (PGI):                         [$1,235,520]│
│                       169                                         │
│   Less Estimated Vacancy at  [15.00%]  of PGI            [$185,328]│
│                              [See Range]                          │
│                                                                   │
│   Effective Gross Income (EGI):                         [$1,050,192]│
│                                                                   │
│   169 ── Less Expenses at  [57.00%]  of PGR              [$598,609]│
│                            [See Range]                            │
│                                                                   │
│   Net Operating Income (NOI):                            [$451,583]│
└───────────────────────────────────────────────────────────────────┘
For Help, press F1
```

Valuation Report

GENERAL INFORMATION
Date Prepared: Jan 15, 2004
Prepared By: Al Assessor
Parcel Number: 12-65800-003
Address: 456 Cliffside Rd.
Name: Ocean View Apts.
Number of Units: 75

Property Category: Multi-family/Apartments/Multiple Residence (Rental Units) - 41 to 100 Unit Project

RANKING SUMMARY                                     Overall Rank: Tier2
Overall Location:        Average
Condition:               Average
Quality/Appeal:          Average
Demographics:            Average
Design/Avg. Unit Size:   Average
Amenities:               Average
Age:                     10-25 Years

INCOME ANALYSIS
Income:        $320/unit/month avg.     Expenses:           52.00% of EGI
Vacancy Rate:  12.00% of PGI            Overall Cap Rate:   9.50%
Additional Income: 4.00 of PGI Projection of Net Operating Income       *Potential Income Detail*
Potential Gross Rent      $468,000       75 Units x $520/Month x 12 months=$468,000
Additional Income        + $18,720
Potential Gross Income     $486,720
Less Vacancy             - $58,406
Effective Gross Income     $428,314
Less Expenses            - $222,723
Net Operating Income       $205,591

FINAL VALUE CALCULATION: NOI ÷ Overall Cap Rate =    $2,164,115
(land, building, site improvements, & FF&E, as of 2002)

NOTES          Economic Indicator Selection:   Using Recommended Values
Personal Property Allocation: $50,000 FF&E (Personal Property)
$2,114,115 Total Value w/o FF&E Considered Page 1

Valuation Report

GENERAL INFORMATION

| | |
|---|---|
| Date Prepared: | Jan 18, 2004 |
| Prepared By: | Al Assessor |
| Parcel Number: | 12-456800-003 |
| Address: | 456 Cliffside Rd. |
| Name: | Ocean View Apts. |
| Number of Units: | 75 |

Property Category: Multi-family**Apartments/Multiple Residence (Market Rate) – 41 to 100 Unit Project

RANKING SUMMARY                                     Overall Rank: Tier2

| | | | |
|---|---|---|---|
| Overall Location: | Average | Demographics: | Average |
| Condition: | Average | Design/Avg. Unit Size: | Average |
| Quality/Appeal: | Average | Amenities: | Average |
| Age: | 10-25 Years | | |

INCOME ANALYSIS

| | | | |
|---|---|---|---|
| Income: | $520/unit/month avg. | Expenses: | 52.00% ofEGI |
| Vacancy Rate: | 12.00% of PGI | Overall Cap Rate: | 9.50% |
| Additional Income: | 4.00 of PGR | | |

Projection of Net Operating Income          *Potential Income Detail*

| | | |
|---|---|---|
| Potential Gross Rent | $468,000 | 75 Units x $520/Month x 12 months=$468,000 |
| Additional Income | + $18,720 | |
| Potential Gross Income | $486,720 | |
| Less Vacancy | − $58,406 | |
| Effective Gross Income | $428,314 | |
| Less Expenses | − $222,723 | |
| Net Operating Income | $205,591 | |

FINAL VALUE CALCULATION: NOI ÷ Overall Cap Rate = $2,164,115
(land, building, site improvements, & FF&E, as of 2002)

NOTES   Economic Indicator Selection:   Using Recommended Values
Personal Property Allocation:   $50,000 FF&E (Personal Property)
$2,114,115 Total Value with FF&E Considered

Fig. 16

Compare Value to Cost-Based Value [X]

Compute Cost-Based Value —220

Land Value: $400,000 —222

Total True Tax Value (building and site improvements): $2,500,000 —224

Obsolescence (if on property record card): $0

Cost-Based Value: $2,900,000

Compare Cost-Based and Income Values

Income Value (trended, with FF&E considered): $1,960,012

Cost-Based Value: $2,900,000 —226

Percent Difference: 32.41% —218

[Separate Components] [View/Print Report] [Obsolescence Analyzer]

[Help]

Fig. 21

Obsolescence Test: Question 1/10  [X]

Are there any extreme detrimental conditions from outside the property that could impact value? Noise or odor, or other extreme issues that you do not feel are accounted for in your location rating. Include perceptions regarding environmental issues and external conditions, whether based on fact or not, such as an electric substation/landfill/cemetery/crime site on an adjacent parcel.

○ Yes    ● No

[Cancel]    [Next]    [Help]

Fig. 22

Obsolescence Test: Question 4/10  [X]

Is the complex built in an atypical style? An example would be low to moderate rent project of 56 units, built in fourteen 4-plexes rather than in two buildings of 28 units each. A layout of this type would measurably increase maintenance costs.

○ Yes    ● No

[Cancel]    [Next]    [Help]

Fig. 23

Obsolescence Test: Question 9/10

Is there common utility metering? Answer no if each apartment unit is separately metered for gas/electricity.

○ Yes    ⊙ No

[Cancel]  [Next]  [Help]

Obsolescence Results

228 — Your answers indicate that the percentage difference between the values is due to other factors, not obsolescence.

Click on "More Info..." for information about what this indicates.

230  232  233
[View/Print Report]  [More Info...]  [Close]

Obsolescence Results

229 — Your answers indicate that the percentage difference between the values may be due to obsolescence.

Click on "More Info..." for information about what this indicates.

234  236  238
[View/Print Report]  [More Info...]  [Close]

Fig. 26

| Application Help |
| --- |
| Contents \| Index \| Back \| Print |

Obsolescence Help

If you have answered no to all of the questions in the obsolescence test, this indicates that the difference from the cost-based value is due to other factors, not obsolescence.

Did you select the "use custom" parameters option for the Net Operating Income model, and did you input any figures that were outside of the recommended ranges? If so, then this could be the primary reason why the final value results are different. If you believe your figures are correct, consider the following statements.

Check that you have input the correct values (square footage, number of rooms, etc.) for the property, and that you have selected the appropriate category type. From the end of the obsolescence test, you may click "Close" to return to the main page and check the current values.

Click "View/edit rankings" and check that you have ranked your property as accurately as possible, especially regarding location. Location is the most important component of the ranking

Fig. 27

Application Help

| Contents | Index | Back | Print |

QuickStart Guide

Property Example for Quick Start Guide

This guide will walk you through the modeling of a 50-unit apartment complex. There will be two examples: 1) the project without obsolescence, and 2) the project under the conditions required to test for obsolescence. With these two examples, most of the features of the program will be shown. Note, however, that every property type has its own individual rank criteria, screens, choices, and economic indicators. Many of the following "multi-family" screens will look similar to the "lodging" or "industrial" models, while others are very different, or do not apply.

Fig. 28

Application Help

[ Contents ] [ Index ] [ Back ] [ Print ]

Glossary access: The path through a neighborhood by which a property is approached; the means of physical entrance into or upon a property.

anchor tenant: The major store with a shopping center that attracts or generates traffic for the facility, e.g.

Appraisal Institute: Nonprofit organization of real estate valuation professionals involved in residential and commercial appraisal education, research, and publishing. Designations: MAI, RM, SRA, SREA, SRPA.

arms-length sale: A sale or transaction between unrelated parties under no duress.

average daily rate (ADR): In hotel analysis, total guest room revenue divided by the total number of occupied rooms.

average household Income: Estimated average income, or salaried income, per household.

central business district (CBD): The core, or downtown area, of a city where the major retail, financial, governmental, professional, recreational, and service activities of the community are concentrated.

clear height: The dominant or typical vertical measurement from the floor of the structure to the bottom of the lowest overhead beam. Also called clear ceiling height or clearance.

contract rent: The actual rental income specified in a lease.

direct capitalization: A method used to convert an estimate of a single year's income expectancy into an indication of value in one direct step by dividing the income estimate by an appropriate rate.

effective gross income (EGI): the anticipated income from all operations of the real property after an allowance is made for vacancy and collection losses. Effective gross income includes items constituting other income, i.e., income generated from the operation of the real property that is not derived from space rental (e.g., parking rental or income from vending machines).

entrepreneurial profit: A market-derived figure that represents the amount an entrepreneur expects to receive for his or her contribution to a project and risk. Also called entrepreneurial incentive.

excess land: In regard to an improved site, the land not needed to serve or support the existing improvement. In regard to a vacant site or a site considered as though vacant, the land not needed to accommodate the site's primary highest and best use. Such land may be separated from the larger site and have its own highest and best use, or it may allow for future expansion of the existing or anticipated improvement.

external obsolescence: An element of depreciation; a defect, usually incurable, caused by negative influences outside a site and generally incurable on the part of the owner, landlord, or tenant.

Fig. 29

SYSTEM AND METHOD FOR AIDING COMMERCIAL PROPERTY ASSESSMENT

CROSS REFERENCE TO RELATED APPLICATIONS

This application claims the benefit of U.S. Provisional Application No. 60/537,739 filed Jan. 20, 2004, which application is incorporated herein in its entirety.

BACKGROUND OF THE INVENTION

The present invention relates to computer systems, and more particularly, but not exclusively, relates to systems for aiding property assessment.

Assessors are given the monumental task of assessing commercial (and other) real estate in their area, yet are not typically formally trained as real estate appraisers. Currently commercial real estate is assessed by the cost method (cost new−depreciation=assessed value). The income approach consists of these basic components: Gross Income (such as rents) less Vacancy and Expenses=Net Operating Income; then N.O.I. divided by an overall capitalization rate=value. The income approach to valuing commercial property has been used by appraisers and brokers & developers for decades, but not assessors, due to its complexity.

Assessors do not typically understand capitalization rates. They often do not know what the market rent is for the area. Both of these are required details that are necessary for using an income approach. Assessors do not have the time or training to do extensive market data research beyond what is on the property record card, and thus do not use the income approach automated valuation systems that are currently on the market for appraisers. A need exists for further advancements in this area.

Another problem that assessors face is dealing with obsolescence. In simplest terms, obsolescence means "things that can reduce property value compared to other properties", such as an apartment with no air conditioning. Currently, assessors either arbitrarily put on an obsolescence factor because of pressure from property owners to lower taxes, or more often, they use vacancy as the obsolescence factor. For example: a property that happens to be 40% vacant might get a 40% abnormal obsolescence factor (whether or not the vacancy was really due to obsolescence versus poor management, etc). A need exists for improved systems and methods that ensure assessors only apply obsolescence where it actually exists and so assessors can identify when the discrepancy in value is due to some reason other than obsolescence.

The present invention is directed to meeting this and other needs.

SUMMARY OF THE INVENTION

One form of the present invention is a computer system. Other forms include unique systems and methods to aid commercial property assessment.

In one aspect of the invention, a system and method is disclosed that aids assessors in valuing commercial real estate. To support a cost-based value, assessors can use the system to generate an income-based value. At the broadest level, the system prompts assessors to input basic ranking criteria (building location, condition, age, etc.) to describe the property and some basic property data and the system then uses its database of specific market data to calculate an income value. Often assessors do not have the training to understand terminology and/or concepts relating to commercial real estate such as "overall capitalization rate" (which is a ratio between value and net income), gross rent versus net rent, details about expenses, market-specific vacancy rates, etc., but they do know the buildings in their district. They generally do not know what an exact market rental rate might be, but they can select a ranking for the property for different criteria (example: condition=fair, location=average, etc). Once ranked, the system gives the user the option to use default values from the database or to input custom values. The system preferably has a database of rents, vacancy rates, expenses, and capitalization rates specific to a particular market area being assessed.

After the assessor ranks the property and inputs a few basic details regarding the property, the system calculates the income-based value. Assessors more familiar with economic indicators may input custom rents, vacancy, and expenses. Then, based on those custom indicators, the system will calculate and display the appropriate cap rate and the resulting income-based value. The system and method allows assessors to obtain an estimated income value using accessible criteria and without having to do extensive research and input time-consuming details that are not readily available on a property record card, such as detailing an apartment complex into individual units.

In another aspect of the invention, a computer system and method is disclosed that aids assessors in accurately calculating obsolescence. If obsolescence exists, it is typically either functional, external, or a combination of both, and it must be measured by either analyzing the cost of the obsolete component and/or by capitalizing any rent or income loss. Once the income value is calculated, the system can be used to compare the results to the current cost-based assessment. After the user inputs the requested data, the program brings up the trended income value, calculates the percent difference between the cost and income values, and gives the user an obsolescence analyzer test. This test is a series of YES/NO questions tailored to the individual property type. The system evaluates the responses to determine whether obsolescence is likely present. If there is obsolescence, the program walks the user through the correct way to apply it. If there is not obsolescence, additional questions are offered to help discern why there is a discrepancy between the values.

Further forms, embodiments, objects, advantages, benefits, features, and aspects of the present invention will become apparent from the detailed description and drawings contained herein.

BRIEF DESCRIPTION OF THE DRAWINGS

FIG. 10 is a simulated screen for the system of FIG. 1 and process of FIGS. 3A-3B illustrating a help screen the user can view to assist with selecting a proper ranking.

FIG. 11 is a simulated screen for the system of FIG. 1 and process of FIGS. 3A-3B illustrating entering basic property information.

FIG. 12 is a simulated screen for the system of FIG. 1 and process of FIGS. 3A-3B illustrating the main screen where income value is calculated based on recommended parameters.

FIG. 13 is a simulated screen for the system of FIG. 1 and process of FIGS. 3A-3B illustrating the main screen with income value being calculated based on custom parameters.

FIG. 15 is a simulated screen for the system of FIG. 1 and process of FIGS. 3A-3B illustrating a print preview of a valuation report.

FIG. 16 is a simulated report for the system of FIG. 1 and process of FIGS. 3A-3B illustrating example contents of a Valuation Report.

FIG. 21 is a simulated screen for the system of FIG. 1 and process of FIGS. 3A-3B illustrating comparing the system generated income value and determining if the obsolescence analyzer should be run.

FIG. 22 is a simulated screen for the system of FIG. 1 and process of FIGS. 3A-3B illustrating a sample obsolescence analyzer test question.

FIG. 23 is a simulated screen for the system of FIG. 1 and process of FIGS. 3A-3B illustrating another sample obsolescence analyzer test question.

FIG. 24 is a simulated screen for the system of FIG. 1 and process of FIGS. 3A-3B illustrating another sample obsolescence analyzer test question.

FIG. 25 is a simulated screen for the system of FIG. 1 and process of FIGS. 3A-3B illustrating a system message indicating obsolescence is not likely present.

FIG. 26 is a simulated screen for the system of FIG. 1 and process of FIGS. 3A-3B illustrating a system message indicating obsolescence is likely present.

FIG. 27 is a simulated screen for the system of FIG. 1 and process of FIGS. 3A-3B illustrating an obsolescence help screen.

FIG. 28 is a simulated screen for the system of FIG. 1 and process of FIGS. 3A-3B illustrating a sample QuickStart help topic.

FIG. 29 is a simulated screen for the system of FIG. 1 and process of FIGS. 3A-3B illustrating a sample Glossary help topic.

DETAILED DESCRIPTION OF SELECTED PREFERRED EMBODIMENTS

Figure 1:
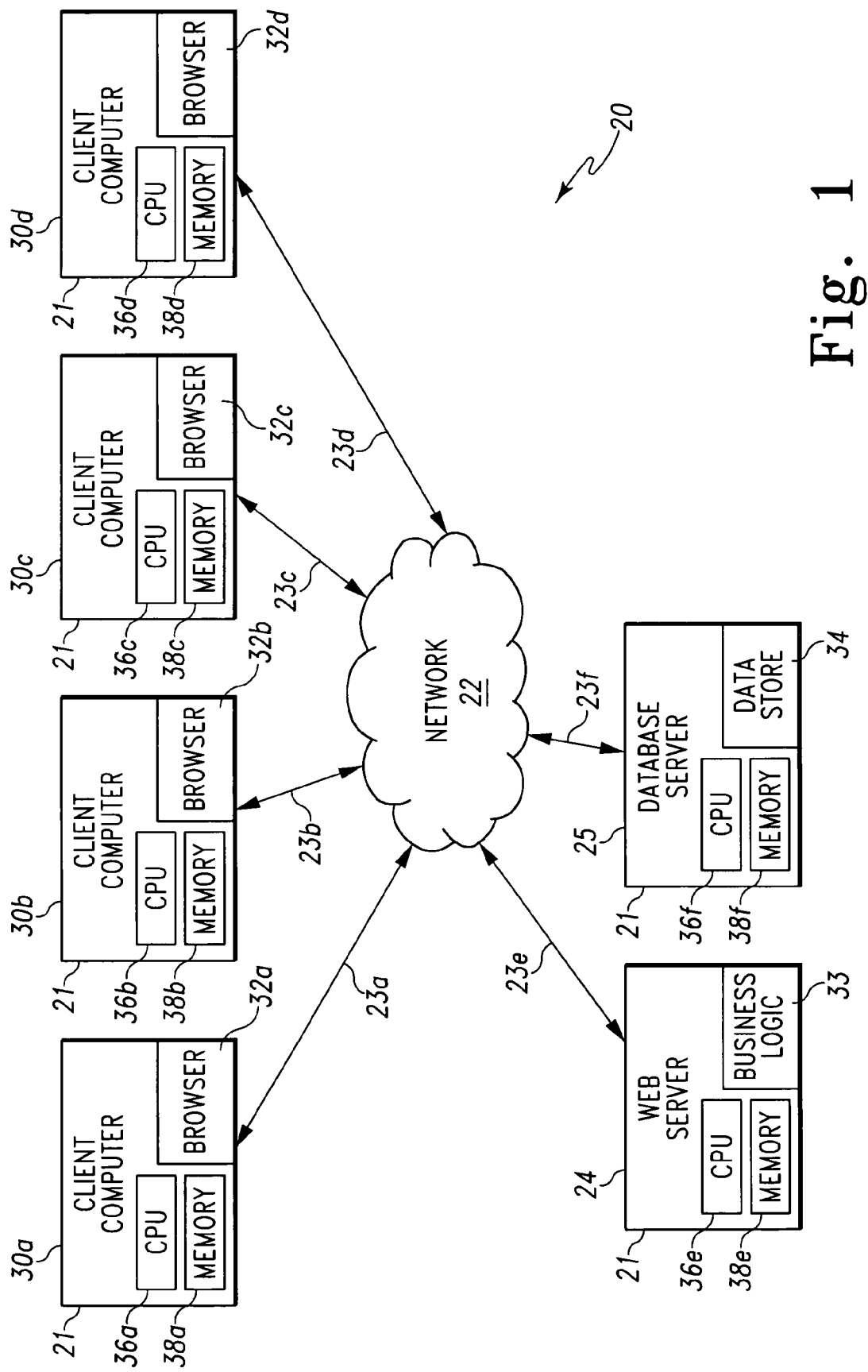
FIG. 1 is a diagrammatic view of a computer system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a diagrammatic view of computer system 20 of one embodiment of the present invention. Computer system 20 includes computer network 22. Computer network 22 couples together a number of computers 21 over network pathways 23*a-f*. More specifically, system 20 includes several servers, namely Web Server 24 and Database Server 25. System 20 also includes client workstations 30*a*, 30*b*, 30*c*, and 30*d* (collectively 30). While computers 21 are each illustrated as being a server or client, it should be understood that any of computers 21 may be arranged to include both a client and server. Furthermore, it should be understood that while six computers 21 are illustrated, more or fewer may be utilized in alternative embodiments.

Computers 21 include one or more processors or CPUs (50*a*, 50*b*, 50*c*, 50*d*, 50*e*, and 50*f*, respectively) and one or more types of memory (52*a*, 52*b*, 52*c*, 52*d*, 52*e*, and 52*f*, respectively). Each memory 52*a*, 52*b*, 52*c*, 52*d*, 52*e*, and 52*f* includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown to preserve clarity, in one embodiment each computer 21 is coupled to a display. Computers may be of the same type, or a heterogeneous combination of different computing devices. Likewise, displays may be of the same type, or a heterogeneous combination of different visual devices. Although again not shown to preserve clarity, each computer 21 may also include one or more operator input devices such as a keyboard, mouse, track ball, light pen, and/or microtelecommunicator, to name just a few representative examples. Also, besides display, one or more other output devices may be included such as loudspeaker(s) and/or a printer. Various display and input device arrangements are possible.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations where Web Server 24 is configured as a web server that hosts application business logic 33, Database Server 25 is configured as a database server for storing relational and other data 35, and client workstations 30a-30d are configured for providing a browser-based user interface 32a-32d, respectively. In one embodiment, at least one of browser-based user interfaces 32a-32d is used for end users to access real estate assessment software. Typical applications of system 20 would include more or fewer client workstations of this type at one or more physical locations, but four have been illustrated in FIG. 1 to preserve clarity. Furthermore, although two servers are shown, it will be appreciated by those of ordinary skill in the art that the one or more features provided by Web Server 24 and Database Server 25 could be provided on the same computer or varying other arrangements of computers at one or more physical locations and still be within the spirit of the invention. Farms of dedicated servers could also be provided to support the specific features if desired.

Figure 2:
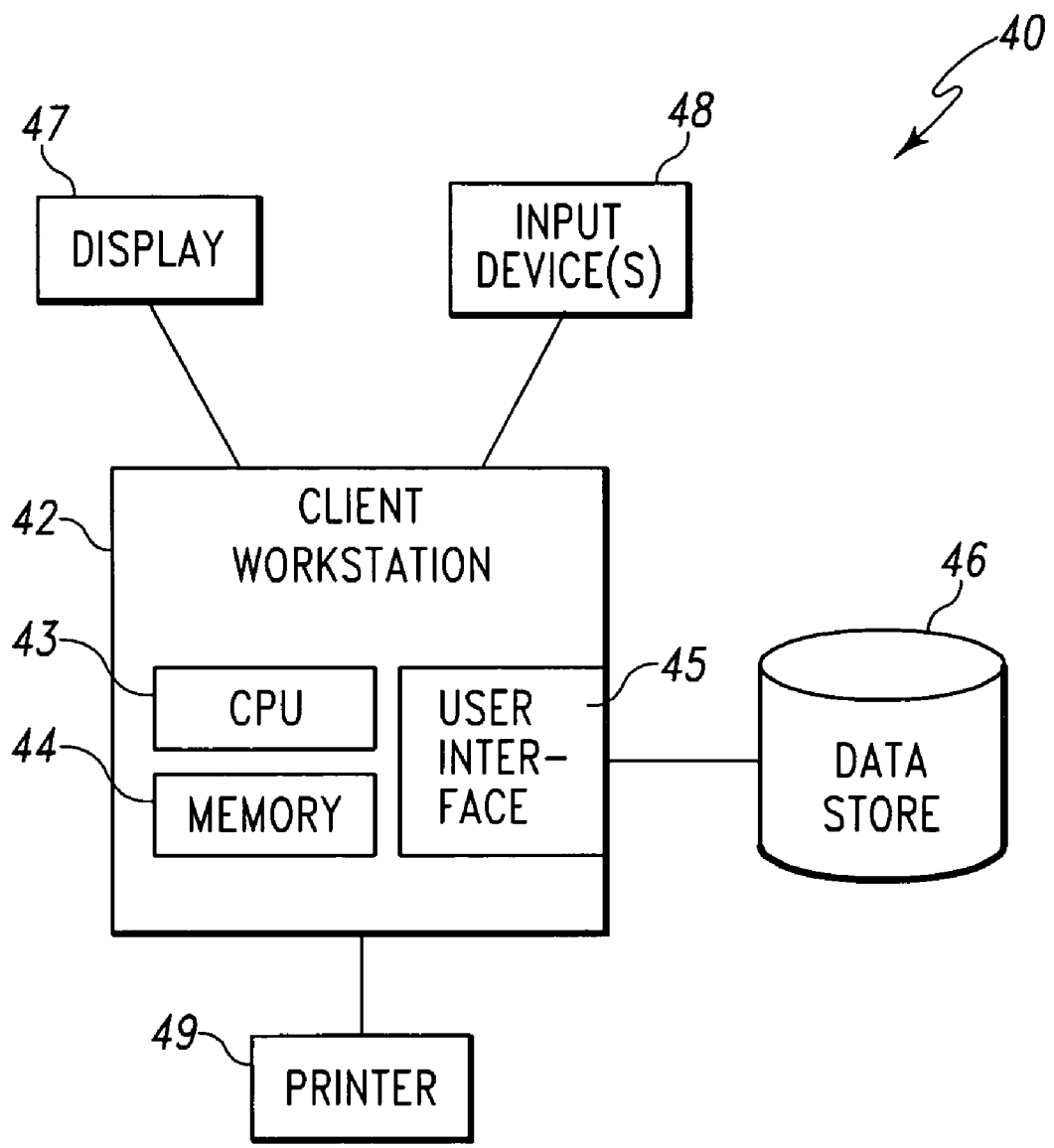
FIG. 2 is a diagrammatic view of a computer system of another embodiment of the present invention.

FIG. 2 is a diagrammatic view of computer system 40 of an alternate embodiment of the present invention. Computer system 40 includes client workstation 42. While client workstation 42 is illustrated as being a client computer, it should be understood client workstation 42 may be arranged to include both a client and server. Furthermore, it should be understood that while one computer is illustrated, more or fewer may be utilized in alternative embodiments. Client workstation includes one or more processors or CPUs 43 and one or more types of memory 44. Each memory 44 includes a removable memory device, although not shown to preserve clarity. Client workstation 42 includes a display 47, one or more input devices 48, and a printer 49. Input devices 48 may include one or more operator input devices such as a keyboard, mouse, track ball, light pen, and/or microtelecommunicator, to name just a few representative examples. Client workstation 42 also includes a user interface 45 that is coupled to and accesses information in database (34 or 46). Database (34 or 46) can be loaded directly on client workstation 42, on a separate computer that is accessible to client workstation 42 over a network, as part of a third-party hosted database accessible over a network, or other variations as would occur to one of ordinary skill in the art.

Although only one client workstation is shown in FIG. 2 to preserve clarity, more client workstations and/or servers could also be present. In such instances, multiple client workstations 42, displays 47, input devices 48, and printers 49 may be of the same respective type, or a heterogeneous combination of different computing devices. When more computers are present, client workstation 42 would typically be coupled to other computers over a network. Computer network could be in the form of a Local Area Network (LAN), Municipal Area Network (MAN), Wide Area Network (WAN), such as the Internet, a combination of these, or such other network arrangement as would occur to those skilled in the art. The operating logic of system 40 can be embodied in signals in programming instructions, dedicated hardware, transmitted over network, or a combination of these.

Alternatively or additionally to entry of data into system 20 and/or system 40, a laptop computer, or a personal digital assistant (PDA), such as a Palm Pilot or Pocket PC, could be used by the user to visit the subject property to gather basic property data and to assist in ranking the property. Once the user returns to the office, the data on the laptop or PDA could be synchronized with a client computer. Alternatively or additionally, the laptop or PDA could communicate with system 20 by a wireless or other connection means so that data gathered while visiting the subject property could be transmitted before the user returns to the office.

In one embodiment, system 20 and/or system 40 aids a property assessor in assessing the value of commercial real estate. The assessor accesses the user interface to the assessment software of system 20 using browser 32a-32f from any one of computers 30a-30f. With system 40, client workstation 42 displays the user interface 45 and allows the assessor to access and use the assessment software. To support their cost-based value, assessors can use system 20 and/or system 40 to generate an income-based value. After ranking the property according to various criteria, the system uses its database (34 on FIG. 1, 46 on FIG. 2) of market-specific data to calculate an income value.

Some non-limiting examples of market-specific data include: market specific rents, vacancy rates, expenses, capitalization rates, and other data that was privately tracked based on industry experience, was obtained by a third party, and/or was obtained from a public source. Database (34 or 46) can reside in one of a variety of locations, including, but not limited to on-site and off-site locations. Database (34 or 46) can be separated into one or more databases. Alternatively or additionally, one or more portions of database (34 or 46) can be hosted on a third party server and accessed by system 20 and/or 40. Database (34 or 46) can be populated with market data through one or more of a variety of ways. For example, database (34 or 46) can include market data that was received in an electronic or other format from a third party commercial market data provider and loaded into database (34 or 46). Alternatively or additionally, database (34 or 46) can reside at a third party commercial data provider location and be updated periodically by the third party provider for access to updated information by system 20 and/or system 40. Alternatively or additionally, database (34 or 46) can include market data that is manually entered by one or more users. Alternatively or additionally, database (34 or 46) can include market data that is uploaded into system 20 and/or system 40. In one embodiment, database (34 or 46) also stores information related to the specific property assessments performed with system 20 and/or system 40 as described in further detail herein. In another embodiment, a separate database is used to store information related to the specific property assessments performed with users of system 20 and/or system 40.

System 20 and/or system 40 allow assessors to obtain an income value without having to do extensive market research (such as interviewing buyers, sellers, and brokers) and input extensive data that is not readily available on a property record card. System 20 and/or system 40 can also be used to aid assessors in accurately calculating obsolescence. Once the income value is calculated, the assessor can compare the results to the current cost-based assessment. System 20 and/or system 40 then help the assessor determine whether or not there is obsolescence.

Figures 3A, 3B:
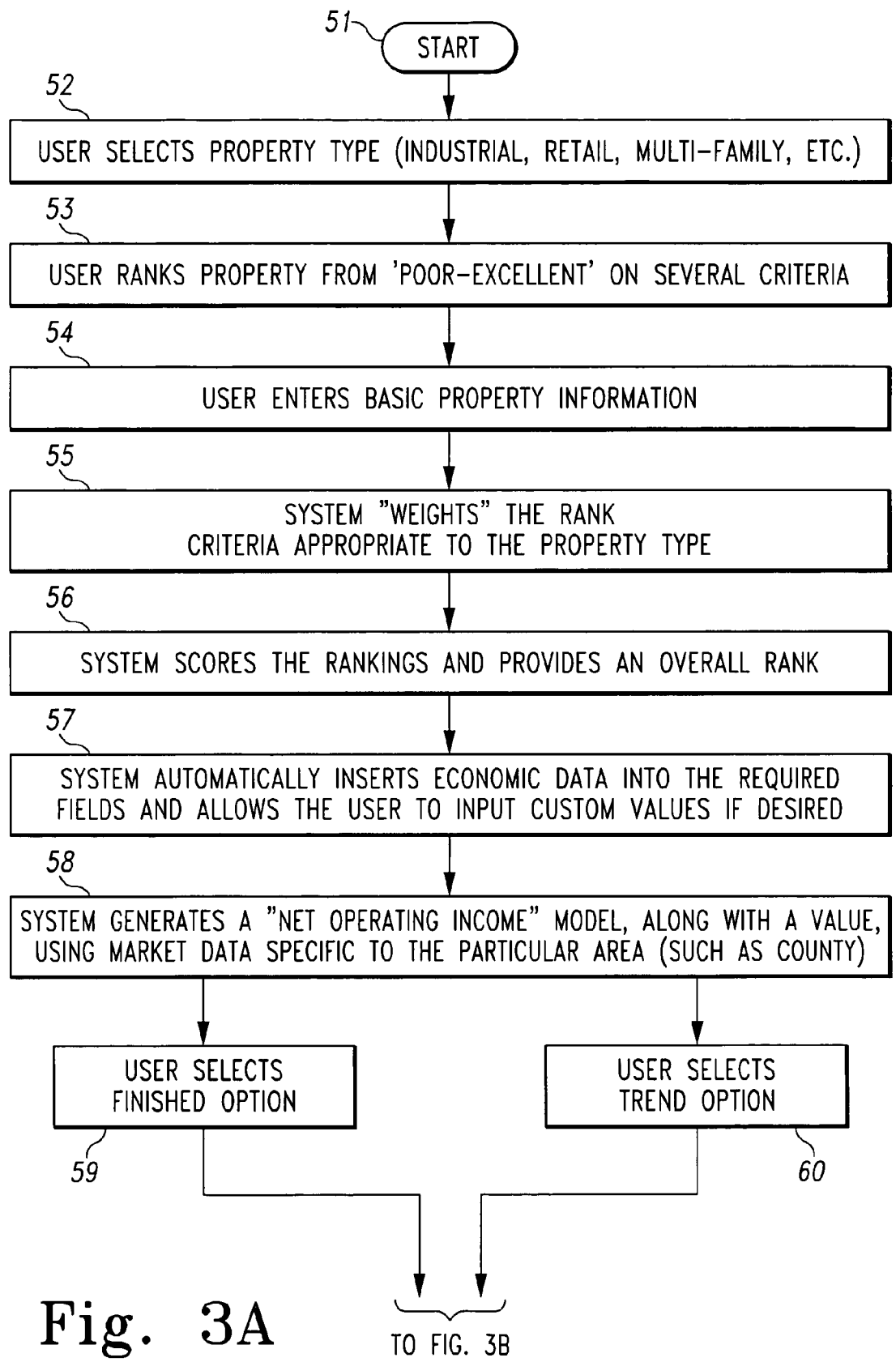
FIG. 3A is the first part of a process flow diagram for the system of FIG. 1 demonstrating the stages involved in generating a new property profile.
FIG. 3B is the second part of a process flow diagram for the system of FIG. 1 demonstrating the stages involved in generating a new property profile.

Referring additionally to FIGS. 3A-3B, one embodiment for implementation with system 20 and/or system 40 is illustrated in flow chart form as procedure 51, which demonstrates a process for generating a new property profile. In one form, procedure 51 is at least partially implemented in the operating logic of system 20. After the user launches user interface 45, procedure 51 begins on FIG. 3A with the user selecting the property type (stage 52). The user then ranks the property from "poor" to "excellent" on several criteria appropriate for the property type (stage 53). The user is then prompted to enter basic property information (stage 54). Using at least some information from database (34 or 46), the system weights the rank criteria appropriately for the selected property type (stage 55) and scores the rankings and then provides an overall rank (stage 56). The system proceeds to a screen where it automatically inserts economic data from database (34 or 46) into the required fields and allows the user to input custom values if desired (stage 57). The system then generates a "Net Operating Income" model, along with an Income Value, using market data from database (34 or 46) that is specific to the particular area (stage 58), such as County, as one non-limiting example.

The user can select a FINISHED option (stage 59) or can select a TREND option (stage 60). Continuing with FIG. 3B, if the user selects a FINISHED option (stage 59), then the user is prompted to input personal property allocations if desired (stage 61). The user then selects the View/Print Report option (stage 62) and a Valuation Report is displayed in a print preview window (stage 63). The user can print the report to a printer if desired (stage 64). If the user selects a TREND option (stage 60), then the system calculates and displays a trended value (stage 65). Trending is necessary because assessments are not applied on a current basis; re-assessments are typically completed every four years. For example, a current assessment "as of" March 2002, would have, per the Assessment Manual, an actual date of value of Jan. 1, 1999. In this example, the cost-based value is "as of" Jan. 1, 1999. So, since the value generated by the system will be "as of" 2002, the system must trend this value in order to properly compare it to real estate market conditions "as of" Jan. 1, 1999. The user can also input personal property allocations if desired (stage 66).

The user can then select a View/Print Report option (stage 62), or select a Compare to Cost-Based Value option (stage 67). If the View/Print Report option (stage 62) is selected, a Valuation Report is displayed in a print preview window (stage 63) that the user can print to a printer if desired (stage 64). If the user selects the Compare to Cost-Based Value option (stage 67), then the user inputs cost-based value data and compares the cost-based value to the system generated income value (stage 68). The user uses the system to take an obsolescence analyzer test if required, along with optionally viewing educational information on obsolescence (stage 69). If the obsolescence analyzer test is not required, then the user can select an option to separate components (stage 70) and input a land value so the system can calculate the improvement-only value (stage 71). The separate components option can be used to separate the final income-based value into 'land-only' and 'improvements-only' since this is the way assessed values are typically listed on property record cards. At any point during the new property process, the user can select an option to Save the property record for later retrieval (stage 72) to database (34 or 46).

The process then ends at end point 74.

Figure 4:
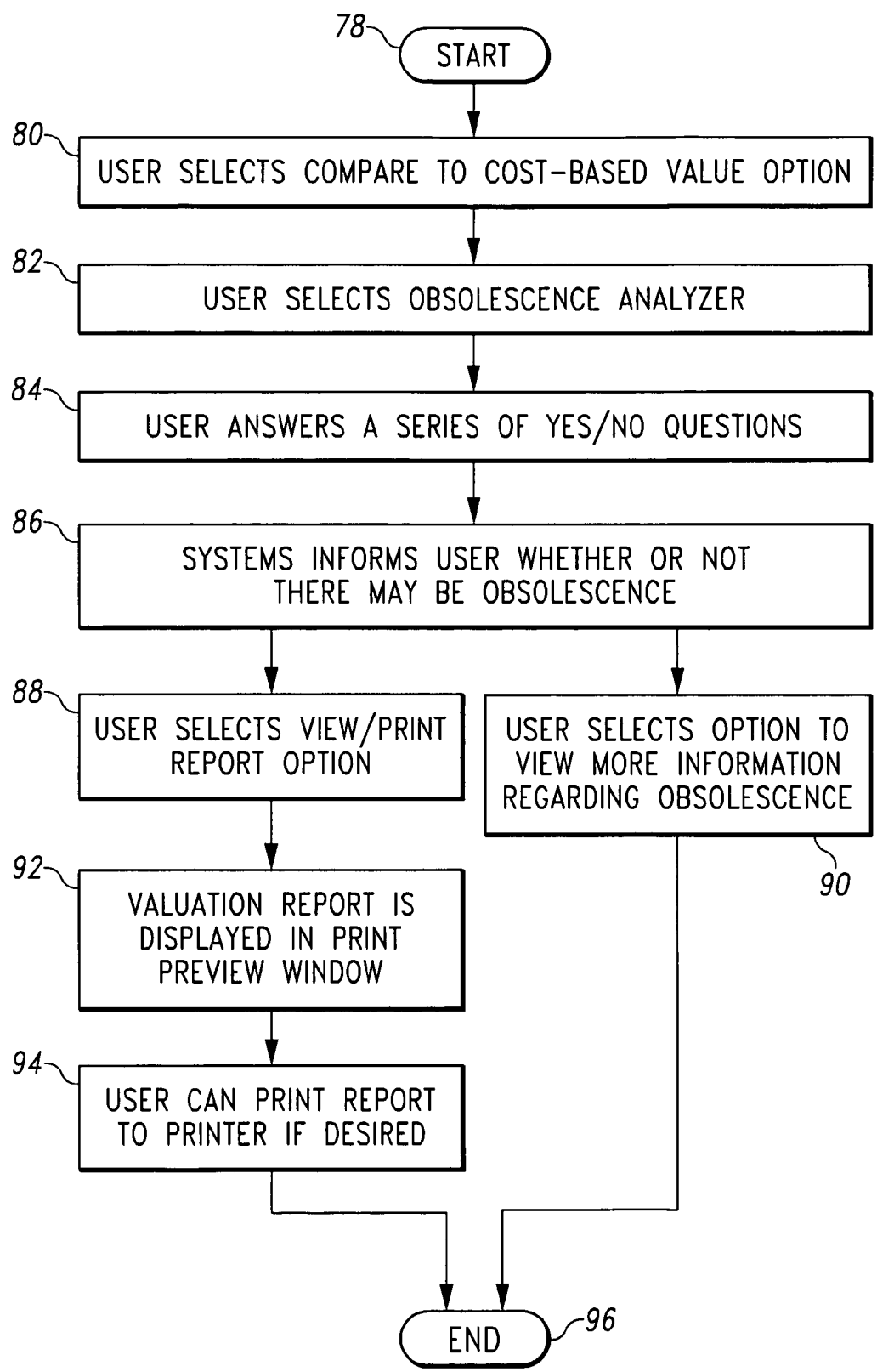
FIG. 4 is a process flow diagram for the system of FIG. 1 demonstrating the stages involved in using the system to help determine whether there is obsolescence.

Referring additionally to FIG. 4, procedure 78 which is illustrated in flow chart form demonstrates in further detail the stages involved in using system 20 and/or system 40 to help determine whether there is obsolescence (see also FIGS. 3A-3B, stages 48-68). In one form, procedure 78 is at least partially implemented in the operating logic of system 20. Procedure 78 begins when the user selects the Compare to Cost-Based Value option (stage 80) in the system. The user selects the Obsolescence Analyzer option (stage 82) and then is presented with a series of Yes/No questions (stage 84). After the user answers all of the questions, the system analyzes the responses and informs the user whether or not there may be obsolescence present (stage 86). At this point, the user can either select a View/Print Report option (stage 88), or can select an option to view more information regarding obsolescence (stage 90). If the user selects the View/Print Report option (stage 88), then the Valuation Report is displayed in a print preview window (stage 92). The user can print the report to a printer if desired (stage 94). The process then ends at end point 96.

Figure 3B:
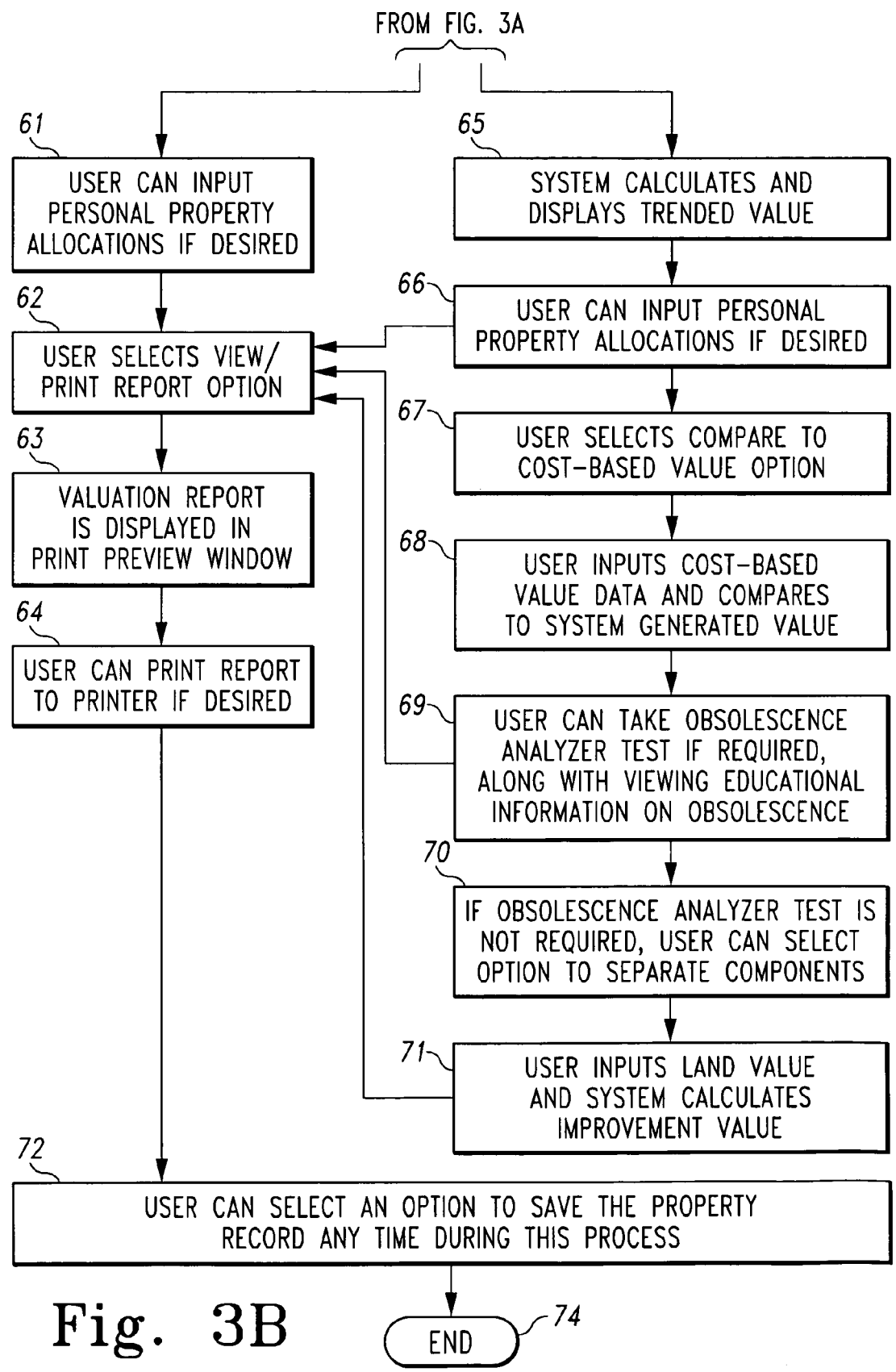
Figure 5:
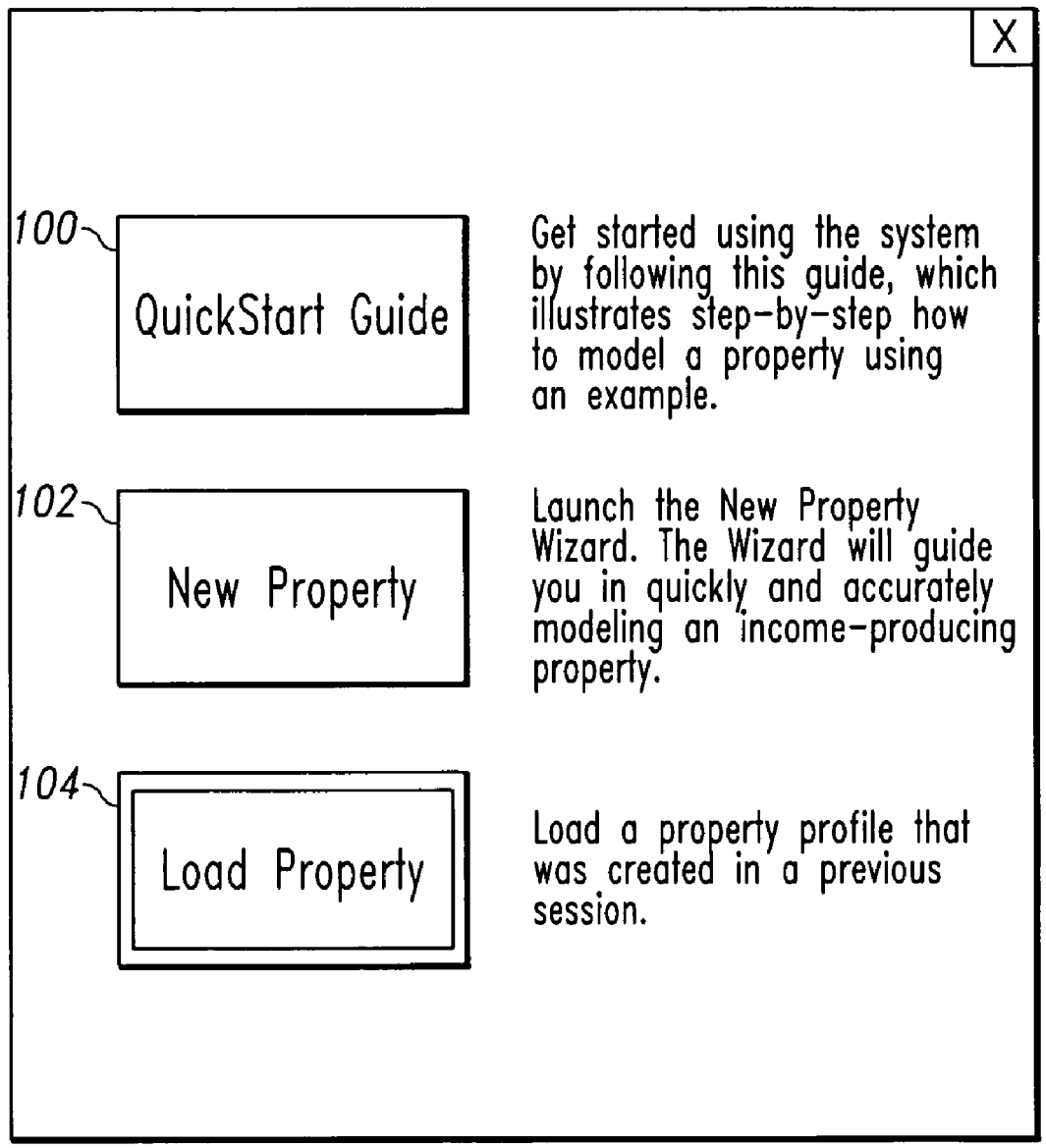
FIG. 5 is a simulated screen for the system of FIG. 1 and process of FIG. 3 illustrating a welcome screen allowing the user to create a new property profile or view an existing one.

The stages outlined in FIGS. 3-4 will now be further illustrated by referring to FIGS. 5-29, which are simulated screens of the assessment aiding software of system 20. This example illustrates how the user, such as an assessor, can use the system to generate an income based value for a property. As shown in FIG. 5, when the software first launches, the user can select an option to view a QuickStart Guide 100, to set up a new property 102, or to load an existing property 104. If the user selects QuickStart Guide option 100, a help screen that models an "example property" step-by-step is displayed. If the user selects the option to load an existing property 104, then the user is prompted to select a saved property to open and the profile for that saved property is retrieved so the user can view/modify the information. If the user selects the option to model a new property 102, then the screen as shown in FIG. 6 is displayed.

Figure 6:
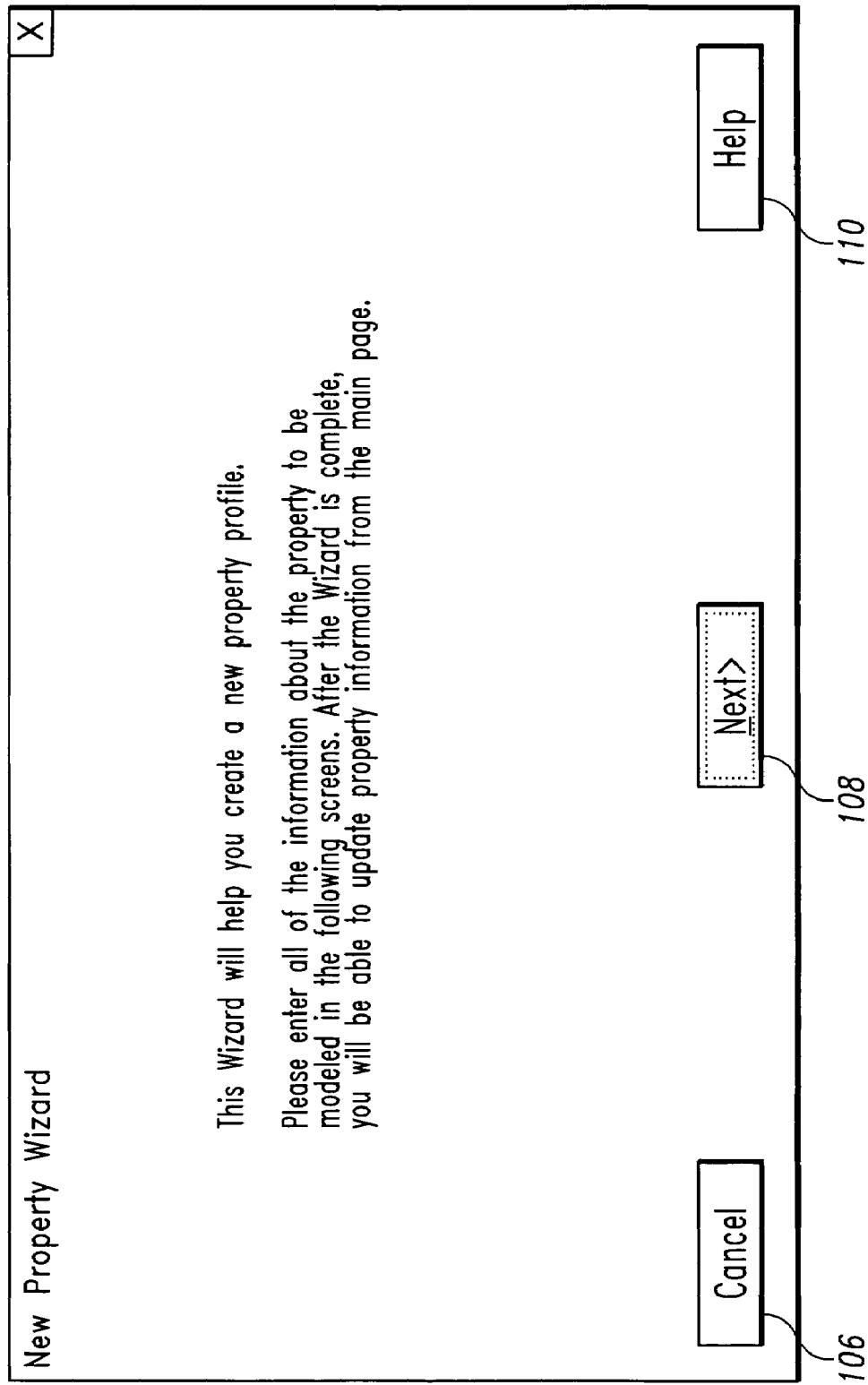
FIG. 6 is a simulated screen for the system of FIG. 1 and process of FIG. 3 illustrating an introduction screen of a new property wizard.

FIG. 6 illustrates the first screen of the New Property Wizard which walks the user through a few easy steps of modeling a property to arrive at an income value. If the user selects the Cancel option 106, then she is returned to the Welcome screen. If the user selects the Help option 110, then a help screen with instructions or other information specific to the present screen is displayed. Most screens include such a Help option and if selected will display context-sensitive help for the particular screen being displayed. If the user selects the Next option 108, then a screen as shown in FIG. 7 is then displayed.

Figure 7:
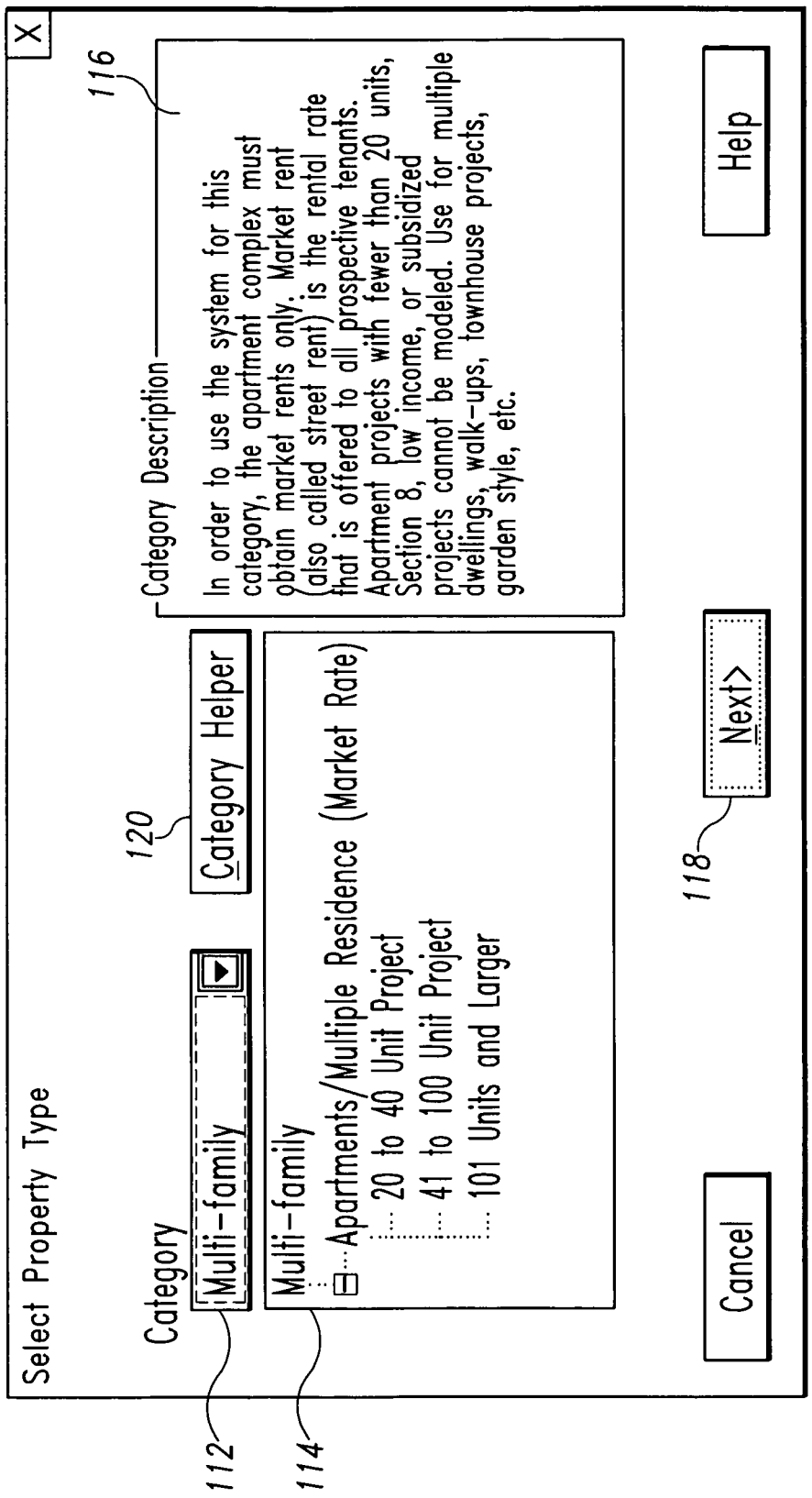
FIG. 7 is a simulated screen for the system of FIG. 1 and process of FIG. 3 illustrating selecting a property type.
Figure 8:
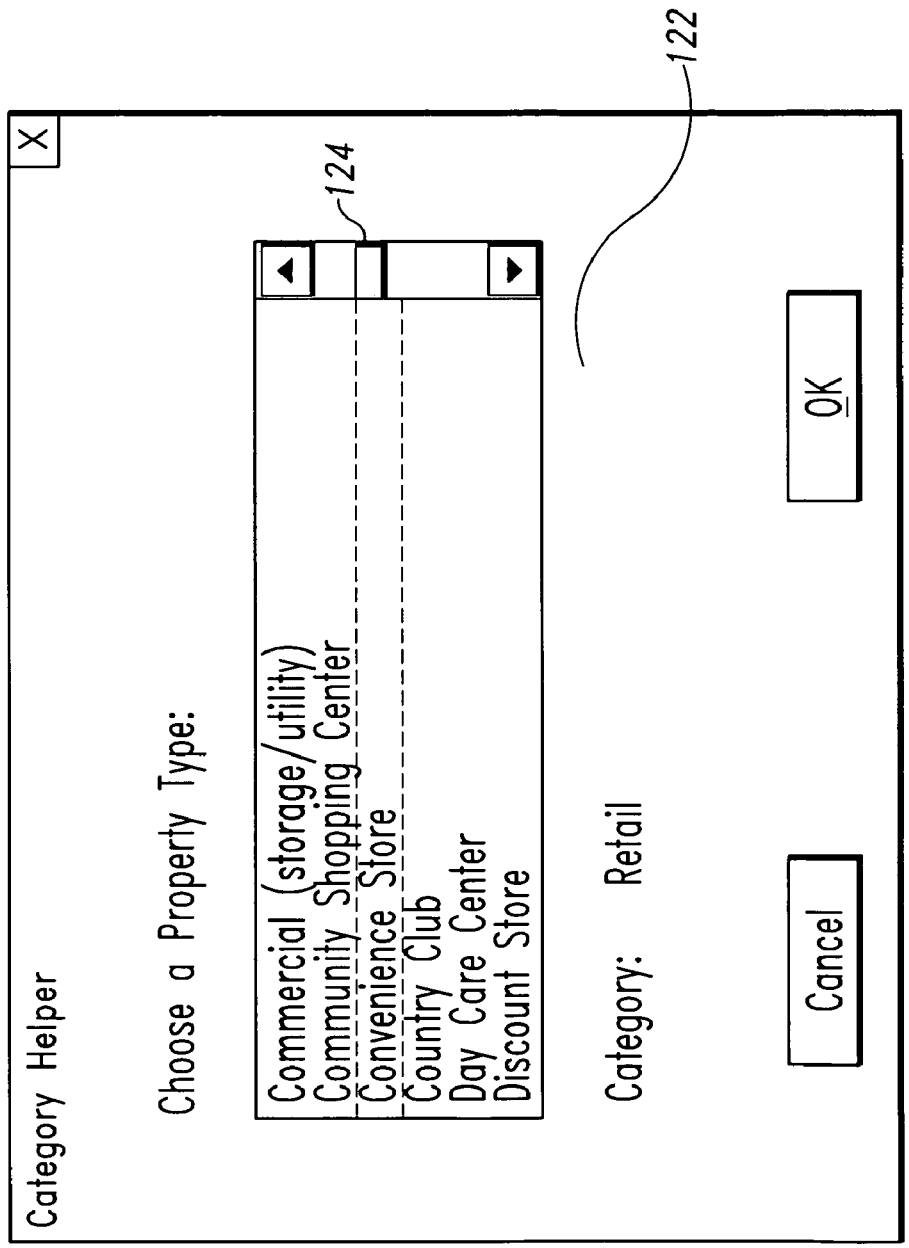
FIG. 8 is a simulated screen for the system of FIG. 1 and process of FIG. 3 illustrating category helpers that aid the user in selecting a property type.

As shown in FIG. 7, the user is prompted to select a property type (stage 52). The property type category field 112 contains a list of the types of properties that can be modeled using the system. In one embodiment, the following property categories can be selected: commercial, industrial, lodging, multi-family, office, retail, and specialty. When the user selects a category 112 from the drop-down list, further subcategories 114 are displayed. In one embodiment, the property types and other drop-down lists described herein are supplied by an administrator who can update the descriptions as desired. In another embodiment, the values described in the drop-down lists are fixed and cannot be modified. One of ordinary skill in the computer software art will appreciate that something other than a drop-down list could also be used to allow a user to provide or select information, such as a combo-box or input box, to name a few non-limiting examples. A category description 116 is displayed to provide the user with details about what the category includes. Once the user selects a category 112 and a sub-category 114, the Next option 118 will be available. If the user needs assistance with selecting a proper category 112, then she can select the Category Helper option 120 to see a screen such as FIG. 8 which displays the proper category 122 for the selected property type 124. Returning to FIG. 7, after selecting the category 112 and sub-category 114, the user then selects the Next option 118. A screen as shown in FIG. 9 then appears.

Figure 9:
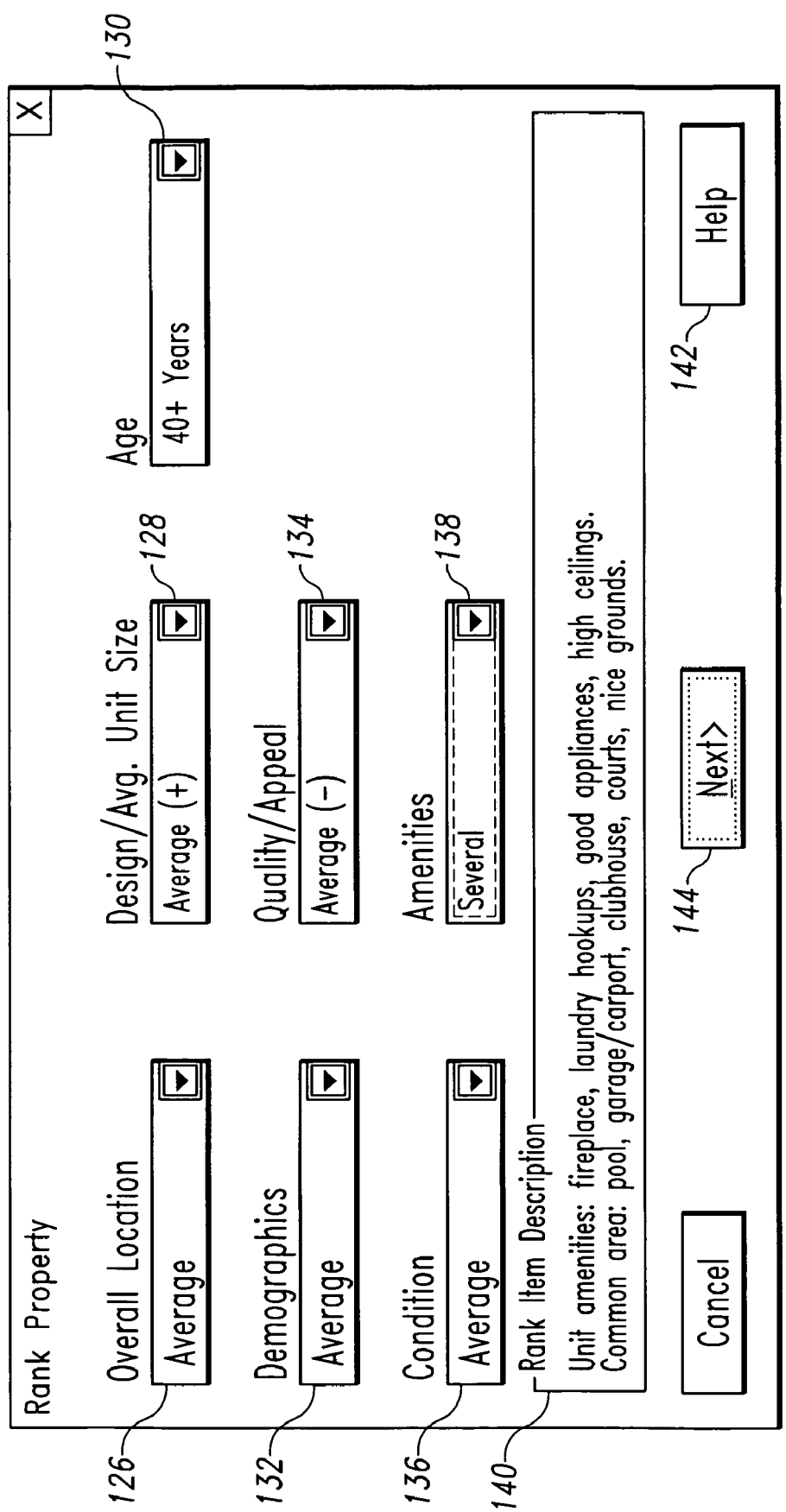
FIG. 9 is a simulated screen for the system of FIG. 1 and process of FIGS. 3A-3B illustrating ranking the property based on various criteria presented.

FIG. 9 is a ranking screen that allows the user to rank the property based on various criteria (stage 53). The ranking criteria displayed vary depending on the category of property previously selected. For example, in the present situation, multi-family was selected for the category. Thus, the following criteria relevant to multi-family properties are displayed for the user to rank: Overall Location 126, Design/Avg. Unit Size 128, Age 130, Demographics 132, Quality/Appeal 134, Condition 136, and Amenities 138. If commercial had instead been selected as the property category, then criteria such as Overall Location, Condition, Age, Demographics, Quality/Appeal, Access/Visibility, and Design/Utility would have been displayed, as a few non-limiting examples. As another example, if industrial had instead been selected for the property category, then criteria such as Overall Location, Condition, Building Utilities/Amenities, Demographics, Percent Office, Quality, Access/Proximity to Highways, Ceiling Height, and Age would have been displayed, as a few more examples.

Returning to the present multi-family example, the user selects the appropriate ranking for each criteria ranging from Low to High. An item description 140 is displayed for the selected criteria so the user can see further details on how to best rank the property for that criteria. If the user needs additional help in determining the proper ranking, she selects the Help option 142 to bring up a screen similar to the one shown in FIG. 10. Returning to FIG. 9, when the user has finishing specifying rankings for each criteria, she selects the Next option 144 to continue and a screen as shown in FIG. 11 is then displayed.

FIG. 11 prompts the user to enter basic property information relevant to the category of property previously selected (stage 54). For example, in the case of the current multi-family property example, the Property Name 146, Address 148, Parcel No. 150, Number of Units 152, and user's name 154 are requested. These fields can vary depending on the type of data relevant to the category of property. For example, if the category was a large shopping center, then the user would also be prompted to input data relevant to each of the areas in the shopping center, such as the square footage of each area (or individual store).

Returning to the current multi-family example, after filling in the requested information about the property, the user selects the Finish option 156 to continue. The screen 158 as shown in FIG. 12 is then displayed to the user. The system weights the rank criteria appropriately for the property type (stage 55), scores the rankings to determine an overall rank 160 (stage 56) and automatically inserts economic data from database (34 or 46) into the required fields 161 with the Recommended Parameters 162 being the default setting (stage 57). In the present multi-family example, the system calculated a Net Operating Income of $205,591 (164) divided by an assigned cap rate of 9.5% (166) in arriving at an Income Value of $2,164,115 (168) (stage 58). The parameters used in required fields 161 and in the calculations are based on market specific data for the particular area the property is located in, such as the County.

Figure 14:
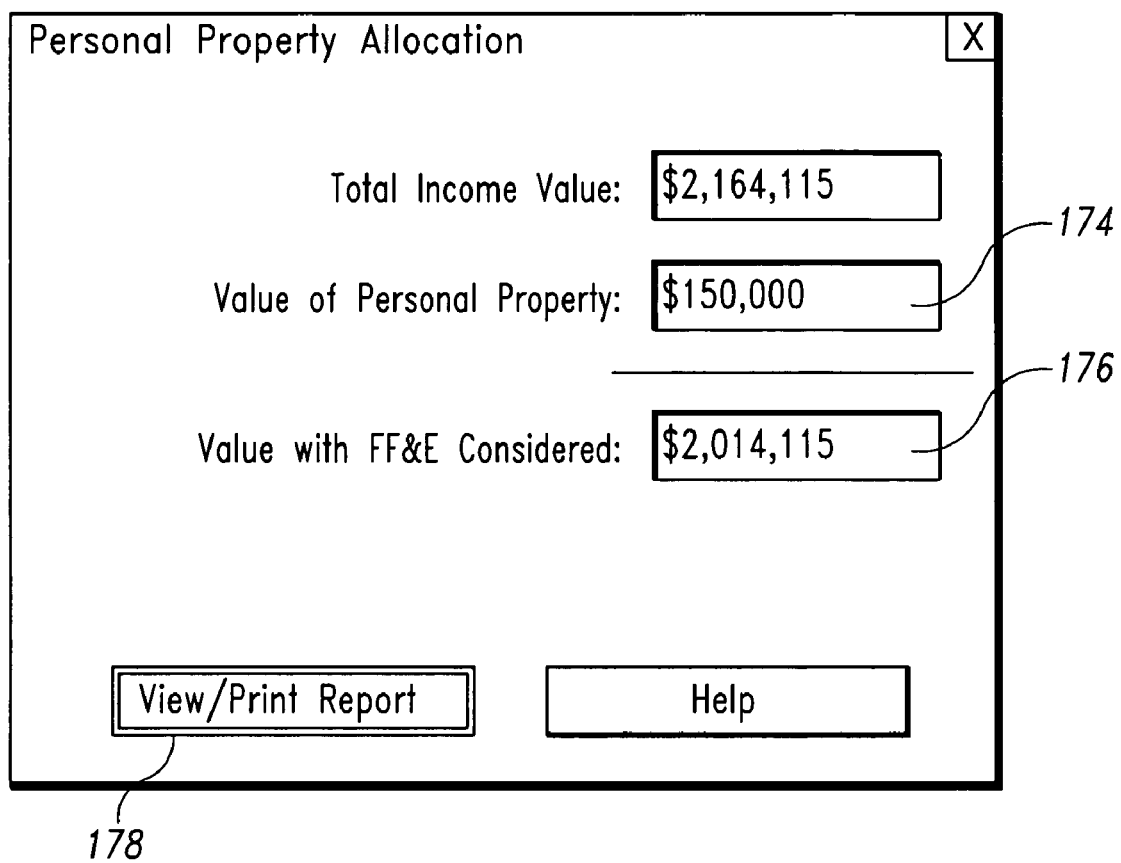
FIG. 14 is a simulated screen for the system of FIG. 1 and process of FIGS. 3A-3B illustrating entering a personal property allocation.

If the user wants to specify her own economic values, she can select the Select Custom Parameters option 163 (stage 57). The Screen then appears more similar to FIG. 13, with the required economic data fields 169 enabled for editing. Returning to FIG. 12, the user can select a TREND option 170 (stage 60) or a FINISHED option 172 (stage 59). If the user selects the FINISHED option 172 (stage 59), then a screen as shown in FIG. 14 is displayed. The user can input the value of the personal property 174 (stage 61), and the system re-calculates the income value 176 with personal property considered. The user then selects the View/Print Report option 178 (stage 62), and a print preview window 180 as shown in FIG. 15 is then displayed (stage 63). From the print preview window 180, the user can then print the valuation report to a printer if desired (stage 64). An example of what the report might look like in printed form is shown in FIG. 16.

Figure 17:
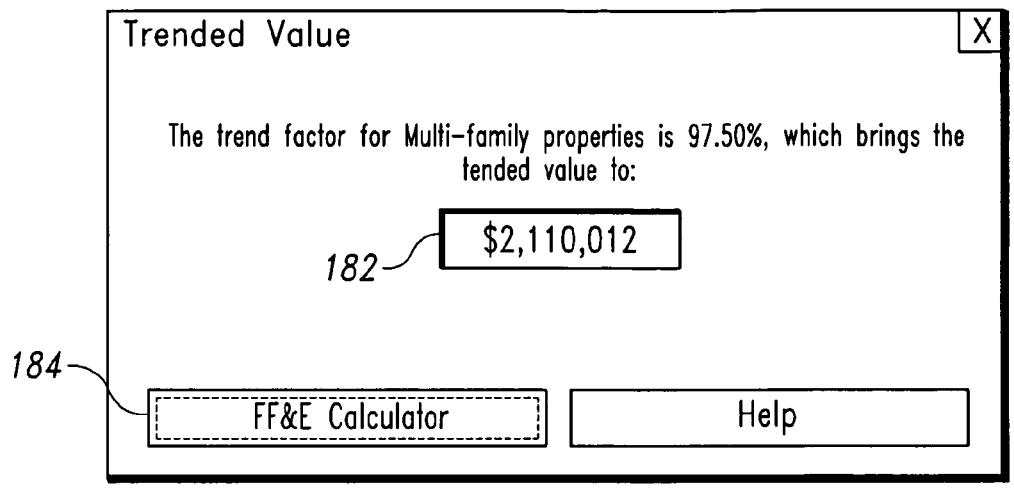
FIG. 17 is a simulated screen for the system of FIG. 1 and process of FIGS. 3A-3B illustrating the system calculating a trended value.
Figure 18:
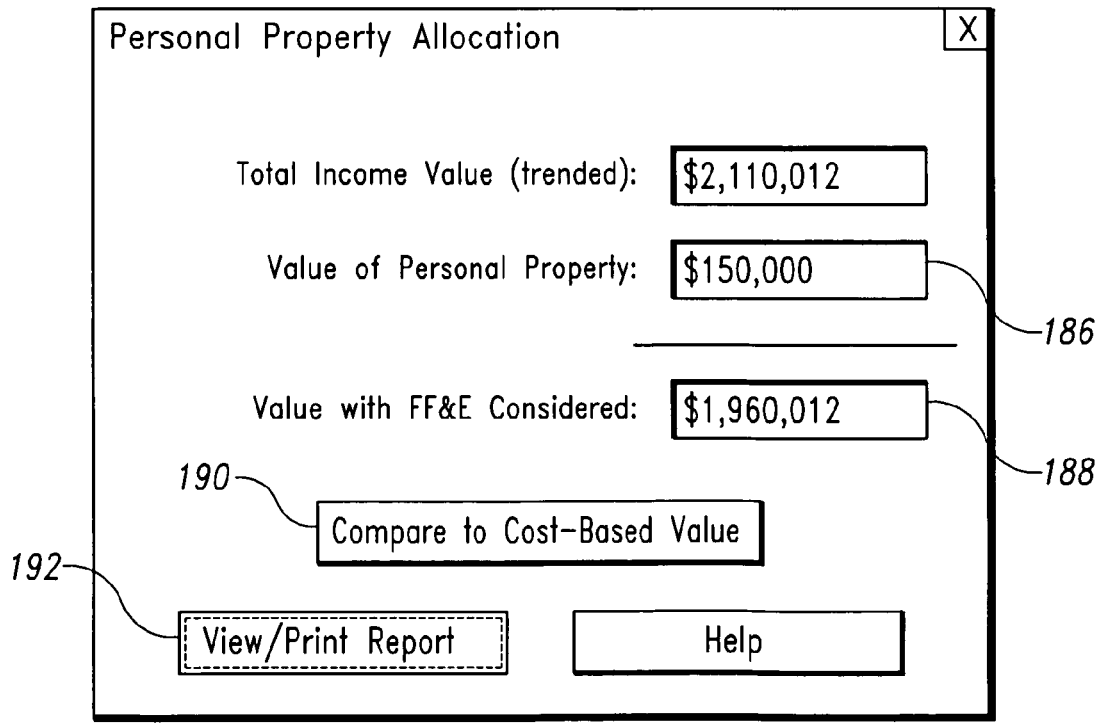
FIG. 18 is a simulated screen for the system of FIG. 1 and process of FIGS. 3A-3B illustrating entering a personal property allocation after the income value has been trended.

Returning to FIG. 12, if the user selects the TREND option 170, a screen as shown in FIG. 17 is displayed. The system calculates and displays the trended value 182 (stage 65). The user then selects FF&E Calculator option 184 (Furniture, Fixtures, & Equipment a.k.a. personal property), and the personal property allocation screen of FIG. 18 is then displayed. If desired, the user can enter the value of the personal property 186 (stage 66) and the system will re-calculate the income value 188 with personal property taken into consideration. At this point, the user can select the View/Print Report option 192 (stage 62) or the Compare to Cost-Based Value option 190 (stage 67). If the user selects the View/Print Report option 192 (stage 62), then the print preview window 180 as previously shown in FIG. 15 is displayed (stage 63), only with the data revised according to the modifications made. Returning to FIG. 18, if the user selects the Compare to Cost-Based Value option 190 (stage 67 of FIG. 3B and stage 80 of FIG. 4), then the screen as shown in FIG. 19 is displayed.

Figure 19:
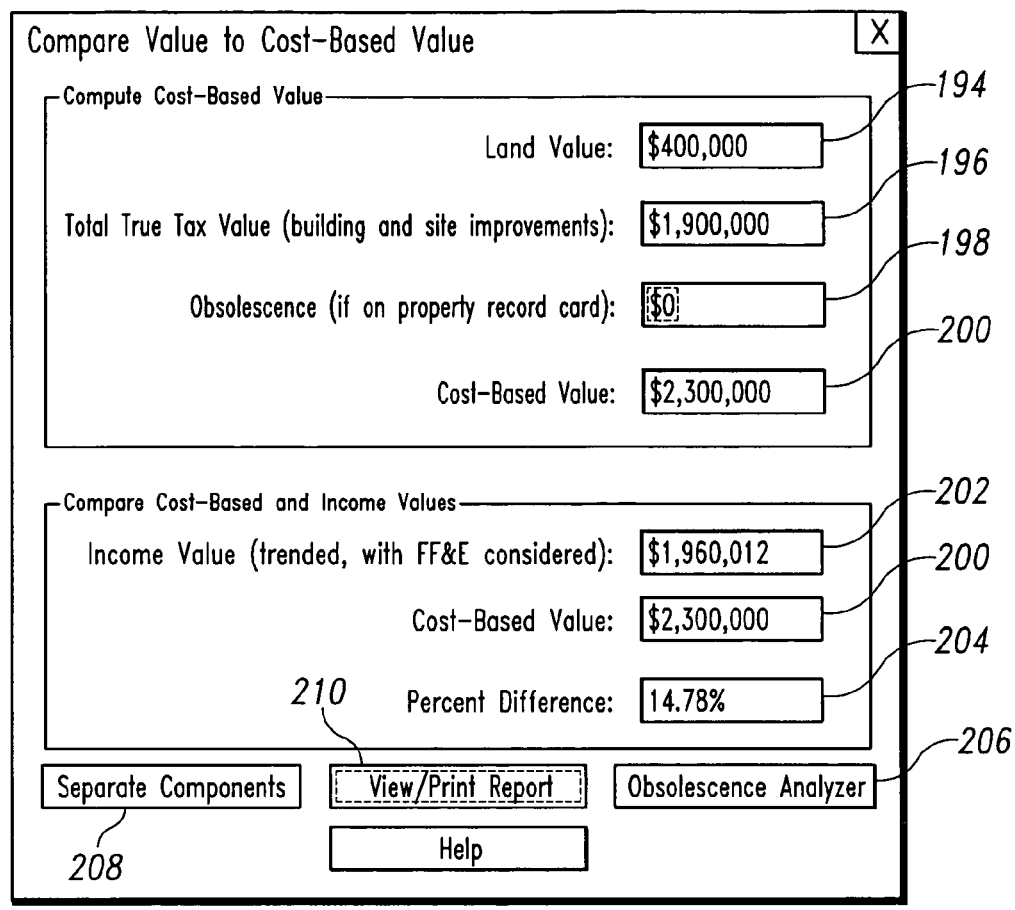
FIG. 19 is a simulated screen for the system of FIG. 1 and process of FIGS. 3A-3B illustrating comparing the system generated income value to the cost-based value.
Figure 20:
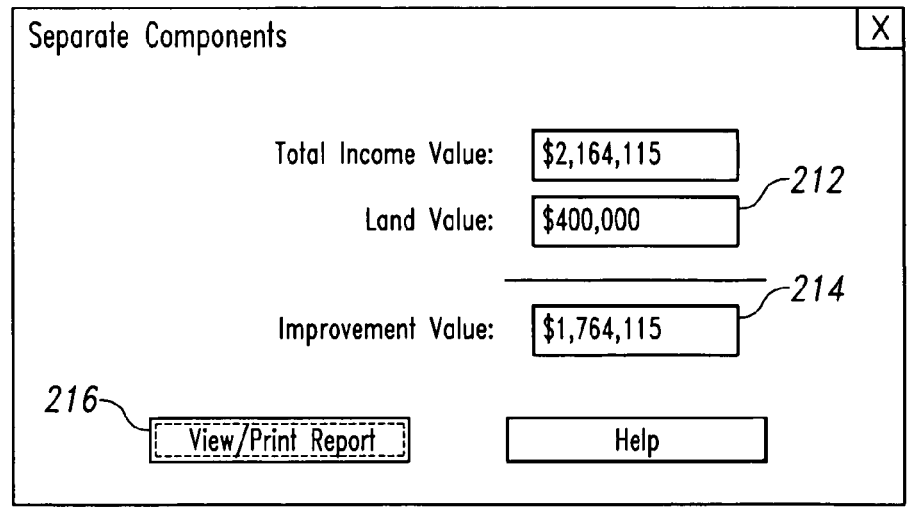
FIG. 20 is a simulated screen for the system of FIG. 1 and process of FIGS. 3A-3B illustrating specifying separate components.

On FIG. 19, the user can input the land value 194, total true tax value 196, and any known obsolescence 198 from property card (stage 68). The system then calculates the cost-based value 200, which can be compared to the system generated income value 202. A percentage difference 204 is also listed. In one embodiment, if the percentage difference is 30% or greater, then the Obsolescence Analyzer option 206 is enabled and the user must select the option 206 to continue (stage 69). Note that other percentages could also be used as the threshold. In the current example, the percentage difference is only 14.78%, so the Separate Components option 208 (stage 70) and View/Print Report option 210 (stage 62) are enabled. If the user selects the View/Print Report option 210 (stage 62), then the print preview window 180 as previously shown in FIG. 15 is displayed (stage 63), only with the data revised according to the modifications made. Returning to FIG. 19, if the user selects the Separate Components option 208 (stage 70), then the user input the Land Value 212 and the system calculates the Improvement-Only Value 214 (stage 71). The user then selects the View/Print Report option 216 (stage 62) with the print preview window 180 of FIG. 15 being displayed (stage 63) with the revised data.

In FIG. 19, the percent difference 204 between the cost-based value and system generated income value was less than the 30% threshold, so the Obsolescence Analyzer option 206 was disabled and not required. FIG. 21 shows an example of when the Obsolescence Analyzer option 218 is enabled. In this instance, the Land Value 220, Total True Tax Value 222, and Obsolescence from the property record card 224 result in a percent difference of 32.41%. Since this exceeds the 30% threshold, the Obsolescence Analyzer option 218 must be selected before the user can continue (stage 69 of FIG. 3B, stage 82 of FIG. 4). When the user selects the Obsolescence Analyzer option 218, a series of screens similar to those shown in FIG. 22-24 are displayed. The user is prompted to answer a series of Yes/No questions (stage 84) so the system can help determine whether there may be obsolescence. FIG. 25 illustrates a message 228 the user sees when the system has determined the percentage difference is not likely due to obsolescence (stage 86). In one embodiment, such a response suggesting there is likely no obsolescence is given if the user answered No to all of the questions. Other variations are also possible. FIG. 26 illustrates a message 229 the user sees when the system has determined the percentage difference is likely due to obsolescence (stage 86). In one embodiment, such a response suggesting there is likely obsolescence is given is the user answered Yes to any of the questions. Other variations are also possible.

On both FIG. 25 and FIG. 26, the user can then select a View/Print Report option (230 and 234, respectively) (stage 88), a More Info option (232 and 236, respectively) (stage 90), or a Close option (233 and 238, respectively). If the View/Print Report option (230 and 234, respectively) (stage 88) is selected, then the print preview window 180 as previously shown in FIG. 15 is displayed (stage 92), only with the data revised according to the modifications made. The user can print the report as desired (stage 94). If the More Info option (232 and 236, respectively) (stage 90) is selected, then a help screen similar to that shown in FIG. 27 is then displayed.

FIGS. 28 and 29 are sample help topics that can be opened from various points in the system. Numerous other help topics are also available and can be opened from the particular screen they relate to (context-sensitive), or from opening the help system itself and selecting a topic.

Alternatively or additionally, the present invention can be used for various other purposes, such as a training system and methodology to help people such as assessors or assessor trainees in understanding the income based method of valuing property.

In one embodiment, an apparatus is disclosed that comprises: a device encoded with logic executable by one or more processors to: receive input from a user to select a property type for a particular real property; receive input from the user to select a ranking score for the property based on each of a plurality of ranking criteria; receive input from the user that includes basic information regarding the real property; calculate an income value of the real property using the ranking score for each of the ranking criteria, at least a portion of the basic information, and information retrieved from a database of market data; and provide the income value to the user.

In another embodiment, a system is disclosed that comprises: a first computer; a second computer, said second computer coupled to said first computer over a network; a database, said database containing market data for a plurality of real properties, said database being accessible from said second computer; wherein said first computer is operable to display a user interface that allows a user to interact with a set of features provided by the second computer; wherein said second computer contains business logic to implement the set of features, said business logic comprising: a type selection module for allowing the user to select a property type for a particular real property; a ranking module for allowing the user to rank the particular real property for each of a plurality of criteria; a profile module for allowing the user to enter basic information regarding the real property; a calculation module that is operable to calculate an income value of the real property using the ranking score for each of the ranking criteria, at least a portion of the basic information, and information retrieved from the database; and an output module that is operable to provide the income value to the user.

In yet a further embodiment, a system is disclosed that comprises: means for receiving input from a user to select a property type for a particular real property; means for receiving input from the user to select a ranking score for the property based on each of a plurality of ranking criteria; means for receiving input from the user that includes basic information regarding the real property; means for calculating an income value of the real property using the ranking score for each of the ranking criteria, at least a portion of the basic information, and information retrieved from a database of market data; and means for providing the income value to the user.

In another embodiment, a method is disclosed that comprises: receiving input from a user to select a property type for a particular real property; receiving input from the user to select a ranking score for the property based on each of a plurality of ranking criteria; receiving input from the user that includes basic information regarding the real property; calculating an income value of the real property using the ranking score for each of the ranking criteria, at least a portion of the basic information, and information retrieved from a database of market data; and providing the income value to the user.

One of ordinary skill in the computer software art will appreciate that the functionality, components and/or screens described herein can be separated or combined on one or more computers or screens in various arrangements and still be within the spirit of the invention.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

The invention claimed is:

1. An apparatus for calculating an income value for assessment of an income-producing real property comprising: a device encoded with logic; a display; and one or more processors configured to execute the logic to: provide to a user a list of income-producing property types on the display; receive input from an input device operated by the user to select from the list of income-producing property types a property type for a particular income-producing real property;

provide to the user on the display a set of ranking criteria associated with the selected property type;

receive input from the user to select a ranking score for the real property for each of the associated ranking criteria, the ranking score being selected from a predefined set of ranking scores ranging from low to high for each ranking criterion;

receive input from the user that includes basic information regarding the real property;

calculate an income value for assessment of the real property using the ranking score for each of the ranking criteria, at least a portion of the basic information, and information retrieved from a database of market data; and provide the income value to the user, prompt the user to answer a plurality of questions relating to obsolescence of the particular real property;

and determine whether there is obsolescence of the property based on the user's answers to the plurality of questions, and if obsolescence is determined to exist, provide instructions to the user on how to apply an obsolescence factor to the income value of the property.

2. The apparatus of claim 1, wherein the device includes a removable memory device carrying a number of processor executable instructions to define the logic.

3. The apparatus of claim 2, wherein the removable memory includes a disk.

4. The apparatus of claim 1, wherein the device is further encoded with logic operable to: prompt a user to input cost-based value data;
calculate a cost-based value of the property based on the cost-based value data;
determine and provide to the user on the display a percentage difference between the calculated cost-based value and the calculated income value;
if obsolescence is determined to exist, provide to the user on the display a message indicating that the percentage difference may be due to obsolescence; and
if obsolescence is determined not to exist, provide to the user on the display a message indicating that the percentage difference is due to factors other than obsolescence.

5. A system for determining an income value for assessment of a particular income-producing real property, comprising: a first computer; a second computer, said second computer coupled to said first computer over a network; a database, said database containing market data for a plurality of income-producing real properties, said database being accessible from said second computer;
wherein said first computer is configured to display a user interface that allows a user to interact with a set of features provided by the second computer;
wherein said second computer contains business logic to implement the set of features, said business logic comprising:
a type selection module for allowing the user to select an income-producing property type for the particular income-producing real property;
a ranking module for allowing the user to rank the particular real property for each of a plurality of criteria associated with the selected property type;
a profile module for allowing the user to enter basic information regarding the real property;
a calculation module that is configured to calculate an income value for assessment of the real property using the ranking score for each of the criteria, at least a portion of the basic information, and information retrieved from the database; and
an output module that is operable to provide the income value to the user, and
an obsolescence module that is configured to prompt the user to answer a plurality of questions relating to obsolescence of the particular real property, determine whether there is obsolescence of the property based on the users answers to the plurality of questions, and if obsolescence is determined to exist, provide instructions to the user on how to apply an obsolescence factor to the income value of the property.

6. The system of claim 5, wherein the first computer and the second computer are the same physical computer.

7. The system of claim 5, wherein the database is stored on the second computer.

8. The system of claim 5, wherein the ranking module is configured to allow the user to rank the particular real property based upon property location and property condition.

9. The system of claim 5, wherein said business logic of said second computer further comprises:
a custom parameters module that is configured to receive from the user custom values for use in calculation of the income value.

10. The system of claim 5, wherein said business logic of said second computer further comprises:
logic operable to prompt a user to input cost-based value data;
calculate a cost-based value of the property based on the cost-based value data;
determine and provide to the user on the display a percentage difference between the calculated cost-based value and the calculated income value;
if obsolescence is determined to exist, provide to the user on the display a message indicating that the percentage difference may be due to obsolescence; and
if obsolescence is determined not to exist, provide to the user on the display a message indicating that the percentage difference is due to factors other than obsolescence.

11. A system for determining an income value for assessment of a particular income-producing real property comprising:
means for receiving input from a user to select an income-producing property type for the particular income-producing real property;
means for receiving input from the user to select a ranking score for the property based on each of a plurality of ranking criteria associated with the selected property type;
means for receiving input from the user that includes basic information regarding the real property;
means for calculating an income value for assessment of the real property using the ranking score for each of the ranking criteria, at least a portion of the basic information, and information retrieved from a database of market data; and
means for providing the income value to the user.

12. A method for determining an income value for assessment of a particular income-producing real property comprising:
providing a system including a processor, a device encoded with logic executable by the processor, an input device, and a display;
providing a database containing market data for a plurality of real properties, the database being accessible by the system;
providing and displaying a list of income-producing property types on the display;
providing for each property type an associated set of ranking criteria;
receiving input from the input device operated by a user to select from the list of property types a property type for a particular income-producing real property;
providing and displaying to the user the set of ranking criteria associated with the selected property type and a predefined set of ranking scores ranging from low to high for each ranking criterion on the display;
receiving input from the input device operated by the user to select a ranking score for the property for each of the associated ranking criteria, the ranking score being selected from the predefined set of ranking scores ranging from low to high for each ranking criterion;
receiving input from the input device operated by the user to input basic information regarding the real property;

calculating, using the processor, an income value for assessment of the real property using parameters including the ranking score for each of the ranking criteria, at least a portion of the basic information, and information retrieved from the database; providing the income value to the user prompting the user to answer a plurality of questions relating to obsolescence of the real property; and determining whether there is obsolescence of the real property, and if obsolescence is determined to exist, providing instructions to the user on how to apply an obsolescence factor to the income value of the property.

13. The method of claim 12, wherein the set of ranking criteria comprises property location and property condition.

14. The method of claim 12, wherein at least some of the predefined ranking score values correspond to conditions of the property that include poor, average and excellent.

15. The method of claim 12, wherein the basic property information includes square footage.

16. The method of claim 12, wherein the basic property information includes the number of units on the property.

17. The method of claim 12, wherein the basic property information includes a property address.

18. The method of claim 12, wherein the basic property information is obtained from a property record card.

19. The method of claim 12, wherein the income value is provided to the user on the display.

20. The method of claim 12, wherein the income value is provided to the user on a report.

21. The method of claim 12, further comprising:

receiving input from the input device operated by a user to specify a custom parameter to use in calculating the income value, wherein the parameters used by the processor executing the logic to calculate the income value further include the custom parameter.

22. The method of claim 21, wherein the custom parameters include potential gross rent.

23. The method of claim 12, further comprising:

prompting a user to input cost-based value data; calculating a cost-based value of the property based on the cost-based value data;

determining and providing to the user on the display a percentage difference between the calculated cost-based value and the calculated income value;

if obsolescence is determined to exist, providing to the user on the display a message indicating that the percentage difference may be due to obsolescence; and if obsolescence is determined not to exist, providing to the user on the display a message indicating that the percentage difference is due to factors other than obsolescence.

24. The method of claim 12 wherein the property type is selected from the group consisting of commercial, industrial, lodging, multi-family, office and retail.

25. The method of claim 12 wherein calculating an income value further comprises weighting the ranking criteria for the selected property type and scoring the rankings to obtain an overall rank.

26. The method of claim 12 wherein calculating an income value further comprises calculating a net operating income for the property, selecting a capitalization rate from the database, and dividing the net operating income by the capitalization rate to obtain the income value.

* * * * *